Jan. 22, 1957 G. H. AMONSEN 2,778,235
VARIABLE SPEED DRIVE
Filed Jan. 9, 1953 3 Sheets-Sheet 1

INVENTOR:
George H. Amonsen
By Philip H. Terrell
ATTORNEY.

Jan. 22, 1957 G. H. AMONSEN 2,778,235
VARIABLE SPEED DRIVE
Filed Jan. 9, 1953 3 Sheets-Sheet 2

INVENTOR:
George H. Amonsen
By
Philip A. H. Terrell
ATTORNEY

Jan. 22, 1957 G. H. AMONSEN 2,778,235
VARIABLE SPEED DRIVE
Filed Jan. 9, 1953 3 Sheets-Sheet 3
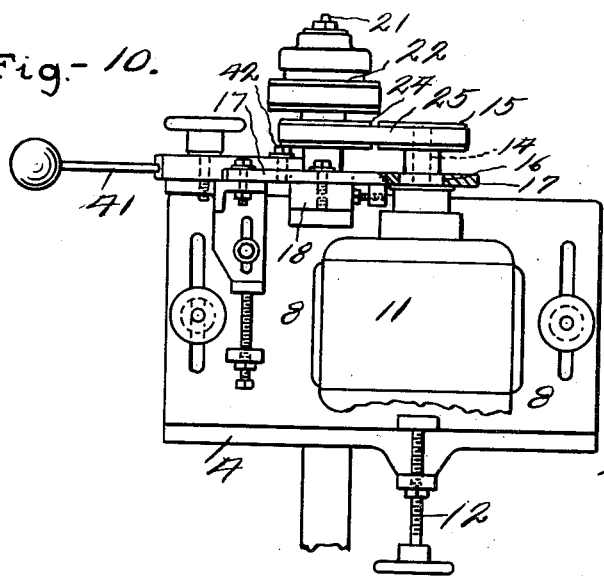
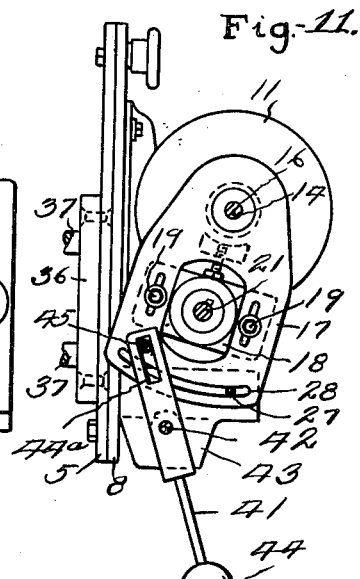
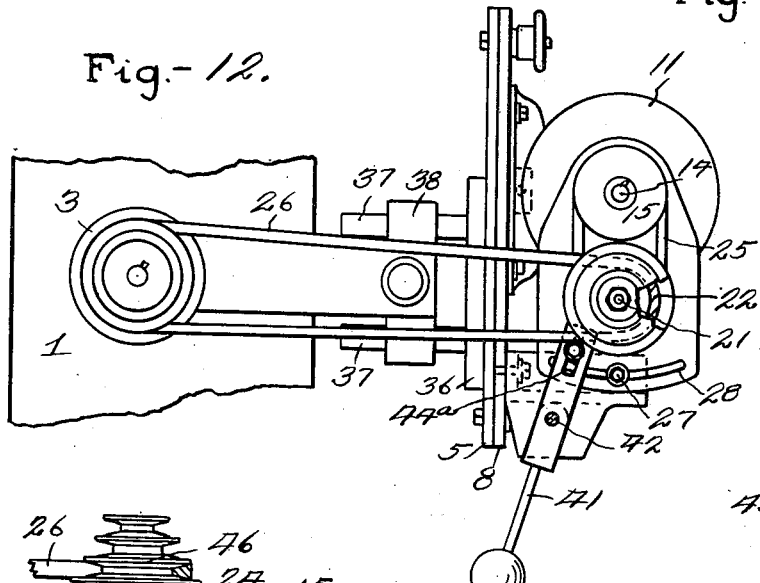
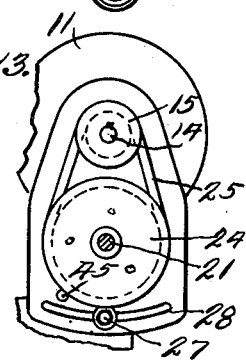
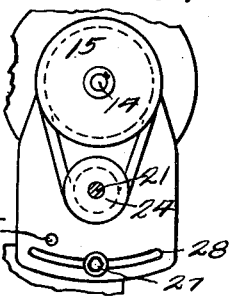
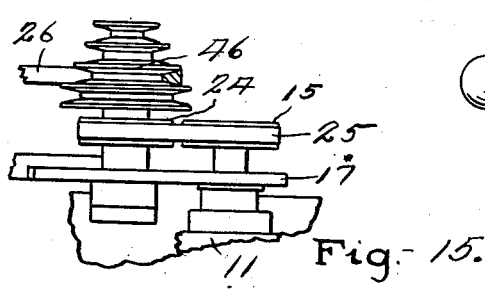
INVENTOR:
George H. Amonsen.
By Philip A. Terrell
ATTORNEY

United States Patent Office 2,778,235
Patented Jan. 22, 1957

2,778,235
VARIABLE SPEED DRIVE
George H. Amonsen, Minneapolis, Minn.

Application January 9, 1953, Serial No. 330,436

2 Claims. (Cl. 74—230.17)

The invention relates to power drive mechanisms, particularly of the variable speed type, and has for its object to provide a device of this kind wherein a driven shaft is driven from a drive shaft through a belt connection and through a variable speed pulley carried by an adjustable plate rockably mounted on the drive shaft, and controlled by mechanism for varying the speed ratio between the drive shaft and the driven shaft.

A further object is to provide the rockable bearing plate, carried by the drive shaft, with an outwardly and inwardly adjustable bearing member carrying the countershaft on which the variable speed pulley is mounted, and to provide means in connection with the rockable bearing plate for moving and holding said bearing plate in adjusted position after the proper ratio of speed is obtained through the variable pulley.

A further object is to mount the motor on a transversely adjustable plate, and the motor plate on a base plate, which base plate is in turn adjustable at a right angle to the motor plate.

A further object is to provide a variable drive, a mechanism having a pulley or drive member on a drive shaft, said drive member on the drive shaft having driving means to a countershaft. Mounted on the countershaft is a suitable pulley and a variable speed pulley or a step pulley, means for making a driving connection from the variable speed pulley or the step pulley to the device that is to be driven either by the variable speed pulley or by the step pulley.

A further object is to provide means whereby the countershaft may be adjusted towards and away from the drive shaft for properly adjusting the drive belt connection betwen the pulley on the drive shaft, and the pulley on the countershaft driving the variable speed pulley.

A further object is to provide a simple and compact variable speed drive between the motor drive shaft and the driven shaft, and one which may be used in various positions, vertically or horizontally, or angular positions if desired.

A further object is to provide a lever control in connection with the pivoted bearing plate on the drive shaft for moving said plate to various positions for belt tightening purposes, and for holding said bearing plate in adjusted position.

With the above and other objects in view the invention resides in the combination and arrangement of parts as hereinafter set forth, shown in the drawings, described and claimed, it being understood that changes in the precise embodiment of the invention may be made within the scope of what is claimed without departing from the spirit of the invention.

Figures 3 to 6 inclusive are schematic figures showing various drive directions from the variable speed pulley.

Figure 7:
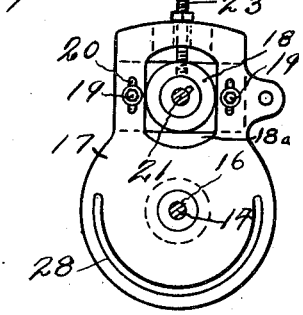

Figure 7 is a view in elevation of the adjustable bearing plate, rockably mounted on the motor shaft.

Figure 8:
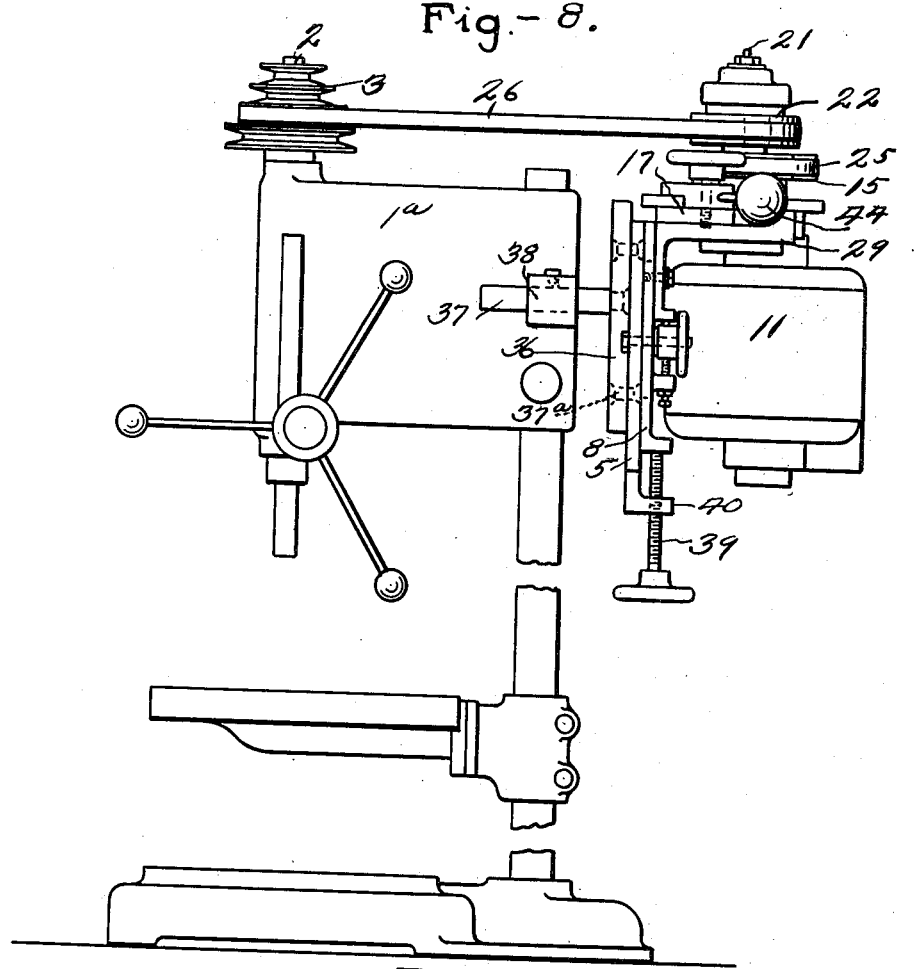

Figure 8 is a side elevation of a conventional form of drill press, showing the device with all shafts vertically disposed.

Figure 9:
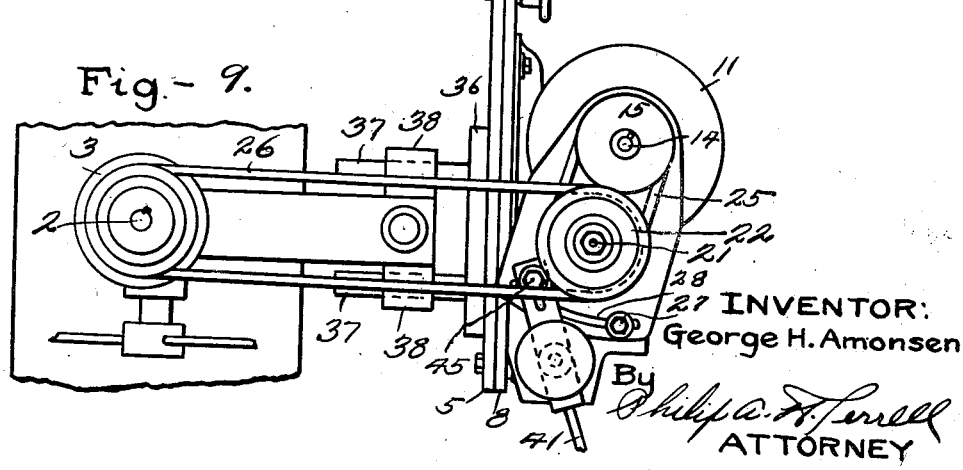

Figure 9 is a top plan view of the device shown in Figure 8.

Figure 10 is a rear view of the device shown in Figure 8.

Figure 11 is a top plan view of Figure 10.

Figure 12 is a view similar to Figure 9, but showing the parts in reverse adjusted position to that shown in Figure 9.

Figures 13 and 14 show views in elevation of the bearing plate with different size pulleys on the drive shaft.

Figure 15 shows a modified arrangement of pulleys wherein a step pulley is used instead of the variable pulley.

Referring to the drawings, the numeral 1 designates a machine to be driven through the medium of its driven shaft 2. Mounted on the driven shaft 2 is a step pulley 3, of conventional construction. Supported on a fixed support 4 is a base plate 5, which base plate is provided with elongated slots 6, through which slots clamping bolts 7 extend. It will be seen that the base plate 5 can be adjusted towards and away from the driven shaft 2, as desired, for adjustment purposes.

Mounted on the upper side of the base plate 5 is a motor base 8 having elongated slots 9 at a right angle to the slots 6, and through which clamping bolts 10 extend. It will be noted, the slots 6 and 9, being at right angles to each other allows the longitudinal and transverse adjustment of the motor 11 as desired. The parts may be further clamped against movement by a jamb or adjusting screw 12, rotatably mounted in a lug 13 carried by the stationary support 4.

Extending outwardly from one end of the motor 11 is a drive shaft 14, which shaft has keyed thereon a drive pulley 15. Rotatably mounted on a bearing 16 of the drive shaft 14 is a rockable bearing plate 17, and it will be understood that the drive shaft 14 rotates in the bearing of the rockable bearing plate. Radially adjustable on the bearing plate 17, adjacent its outer end is an adjustable bearing block 18 which is mounted in bearing block opening 18a, held in adjusted position by bolts 19 extending through elongated slots 20. Anchored in the bearing block 18 is a countershaft 21, which countershaft has rotatably mounted thereon a variable pulley 22 of the V type. The bearing block 18 may be further held by an adjustable screw 23. By adjustably mounting the bearing block 18, the countershaft 21 may be adjusted towards and away from the drive shaft 14 of the motor, and in parallel relation thereto.

The variable speed pulley 22 is driven by a drive pulley 24 on the countershaft, and belted to the drive pulley 15 on the motor shaft by a belt 25, therefore it will be seen that when the drive shaft 14 is rotated the variable speed pulley 22 will also rotate. Variable speed pulley 22 is belted by means of a belt 26 to the step pulley 3 carried by the driven shaft 2, clearly shown in Figures 1 and 2. Various types of variable speed pulleys may be used and the types shown in Patents Nos. 2,050,358 and 2,135,348 are satisfactory.

Figure 1:
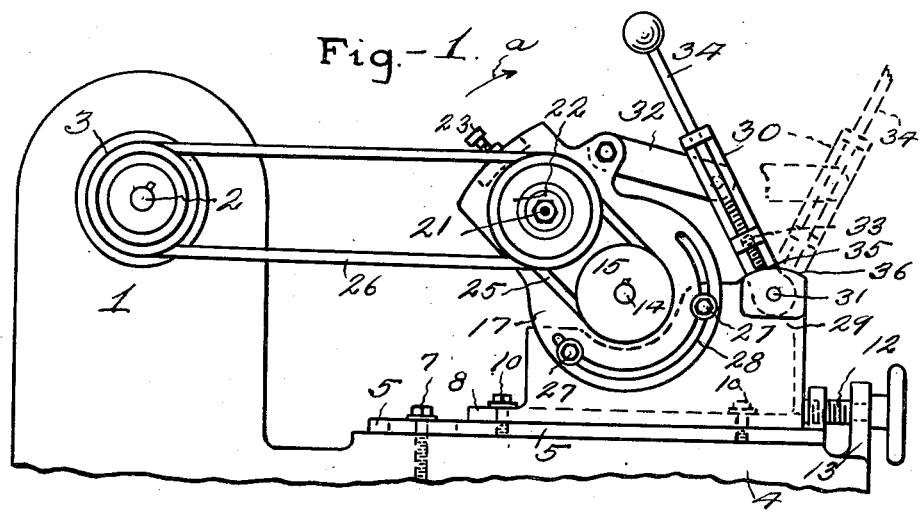
Figure 1 is a side elevation of the drive mechanism, showing the driven shaft and drive shaft in a horizontal position.
Figure 2:
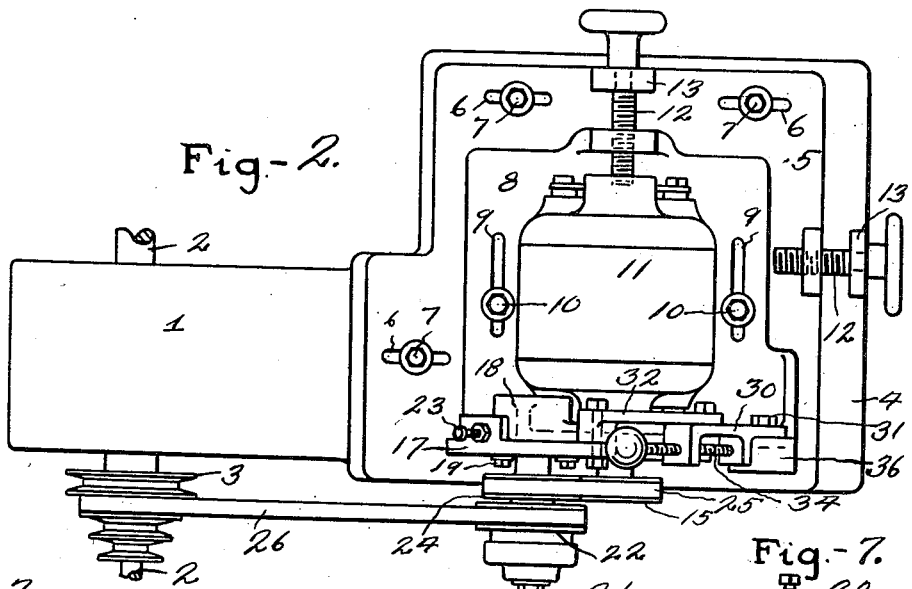
Figure 2 is a top plan view of Figure 1.
Figure 3:
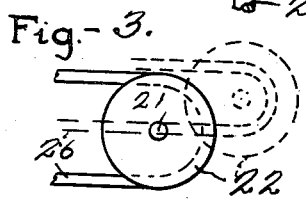
Figure 5:
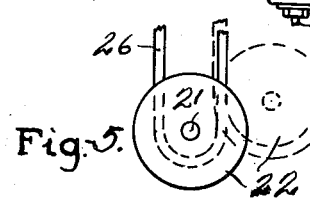
Figure 4:
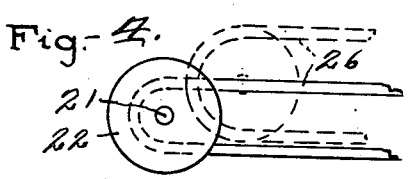
Figure 6:
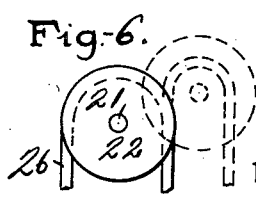

Referring to Figure 1, when the bearing plate is moved in the direction of the arrow a, the elements of the variable pulley 22 will spread apart, or move together for varying the speed of rotation of the driven shaft 2. Bearing plate 17, after being properly adjusted, is locked in adjusted position by means of bolts 27, which bolts extend through an arcuate slot 28 in the plate 17, and into an upstanding support bracket or flange 29 carried by the motor plate 8, hence it will be seen that the speed of operation, after once established, can be maintained, The adjustable bearing plate is controlled by means of a lever 30, pivoted at 31 to the upstanding flange 29, and connected to the outer end of the bearing plate 17 by means of a link 32. The lever 30 has threaded through one of the lugs thereof, at 33, an extensible member 34, and the inner end of which lever, when screwed inwardly, engages at 35, an arcuate surface 36 carried by the flange 29 for holding the bearing plate in adjusted position until the bolts 27 are tightened. It will be noted that the arcuate surface 36 is not concentric with the pivotal point 31, hence there will be a positive holding of the bearing plate.

It is inherent in the structure described above that adjustment of the motor base 8 toward or away from the driven shaft 2 and pulley 3 provides a speed range adjustment for the apparatus. Since the endless belt 26 interconnecting the pulley 3 and variable speed pulley 22 is of finite length, the initial position of the motor base 8 with respect to the pulley 3 determines the displacement of the belt 26 from countershaft 21 and therefore the initial maximum velocity of the belt 26. For instance, as one limiting adjustment the bearing plate 17 may be rotated counterclockwise as seen in Figure 1 to its full extent and the motor base 8 displaced to the right so that the belt 8 is contacting the countershaft 21. With this initial adjustment the belt 26 prevents the bearing plate 17 from being rotated clockwise and only a single speed is obtainable with the apparatus. Conversely the motor base 8 may be shifted to the left to such an extent that the belt 26 is riding on the outermost permissible portion of the variable speed pulley 22 in which case rotation of the bearing plate 17 is permitted to bring the belt to any position on the variable speed pulley 22 and a full range of speed adjustment is permitted. The motor base 8 may be disposed initially in any position intermediate those described above to provide various speed ranges between the two limits previously discussed.

Referring to Figures 8 to 12 inclusive, the structure and operation is substantially the same, the device however being shown with the axis of its motor vertically disposed, for instance for driving a drill press 1a. There are slight structural modifications in the attaching means for attaching the device for vertical use, and lever control. In Figures 8 to 12 the base plate 5 is rigidly secured to a fixed plate 36 by rivets 37a, and the fixed plate is provided with spaced shafts 37 held in sleeves 38 carried by opposite sides of the drill press 1a. The motor base 8 is vertically adjustable by means of an adjustable screw threaded through the lug 40 carried by the plate 5. In this form, the operating lever 41 is pivoted at 42 to the flange 43 so its handle end 44 will be downwardly disposed. The inner end of the handle 41 is provided with an elongated slot 44a, through which slot a lug 45 carried by the bearing plate 17 extends. By manipulating the lever 41 the bearing plate 17 can be moved to various positions, for instance to those shown in Figures 9, 11 and 12, otherwise the structure is the same as in Figure 1, and the same numerals apply.

Referring to Figures 13 and 14, different size pulleys are shown on the drive shaft and the countershaft, which may be desirable in some instances, for providing a greater variation of speed operation.

Referring to Figure 15, a slight modification is shown wherein a step pulley 46 is substituted for the variable speed pulley 22, and in this case the adjusting mechanism acts as a belt tightener.

From the above it will be seen that a variable drive connection between a drive shaft and a driven shaft is provided wherein the driving parts are reduced to a minimum, and one wherein the speed of operation of the driven shaft can be easily and quickly varied.

The invention having been set forth what is claimed as new and useful is:

1. A variable speed drive having selectable speed ranges comprising a motor base, an upwardly extending flange attached to said motor base, a motor having a shaft, said motor mounted on said motor base, a rockable bearing plate positioned substantially parallel to said flange, said rockable bearing plate having a shaft opening and an arcuate opening concentric with said shaft opening, bolt means secured to said flange and extending through said arcuate opening in said rockable plate, said motor shaft being rotatably mounted in said shaft opening in said rockable bearing plate, a counter shaft rotatably mounted in said rockable bearing plate parallel to said motor shaft, a pulley carried by each said motor shaft and counter shaft, means for operatively connecting said pulleys, an expandable and contractable variable speed pulley mounted on said counter shaft, a driven pulley, belt means for operatively connecting said variable speed and said driven pulleys, a lever pivoted to said flange for rotation about one end in the plane of said bearing plate, a link connected between said lever and said bearing plate to rock said bearing plate in response to rotation of said lever about its pivoted end and means for limiting the allowable rotation of said lever to establish a predeterminable speed range, said last mentioned means comprising means for varying the distance between said motor shaft and said driven pulley.

2. A variable speed drive having selectable speed ranges comprising a motor base, an upwardly extending flange attached to said motor base, a motor having a shaft, said motor mounted on said motor base, a rockable bearing plate positioned substantially parallel to said flange, said rockable bearing plate having a shaft opening and an arcuate opening concentric with said shaft opening, bolt means secured to said flange and extending through said arcuate opening in said rockable plate, said motor shaft being rotatably mounted in said shaft opening in said rockable bearing plate, a counter shaft rotatably mounted in said rockable bearing plate parallel to said motor shaft, a pulley carried by each said motor shaft and counter shaft, means for operatively connecting said pulleys, an expandable and contractable variable speed pulley mounted on said counter shaft, a driven pulley, belt means for operatively connecting said variable speed and said driven pulleys, a lever pivoted to said flange for rotation about one end in the plane of said bearing plate, a link connected between said lever and said bearing plate to rock said bearing plate in response to rotation of said lever about its pivoted end and means for limiting the allowable rotation of said bearing plate to establish a predeterminable range of speeds less than the range determinable by said variable speed pulley, said last mentioned means comprising means for varying the distance between said motor shaft and said driven pulley.

References Cited in the file of this patent

UNITED STATES PATENTS

| | | |
|---|---|---|
| 1,070,001 | Bannister | Aug. 12, 1913 |
| 1,348,734 | Pontius | Aug. 3, 1920 |
| 1,854,018 | Carlberg | Apr. 12, 1932 |
| 2,080,319 | Kingsbury | May 11, 1937 |
| 2,108,356 | Twomley | Feb. 15, 1938 |
| 2,198,747 | Stobb | Apr. 30, 1940 |
| 2,287,450 | Price | June 23, 1942 |
| 2,311,993 | Olsen | Feb. 23, 1943 |
| 2,364,855 | Kampstad | Dec. 12, 1944 |
| 2,370,048 | Koch | Feb. 20, 1945 |
| 2,446,645 | Flinchbaugh | Aug. 10, 1948 |

FOREIGN PATENTS

| | | |
|---|---|---|
| 648,802 | Great Britain | Jan. 10, 1951 |